United States Patent
Popescu (12)

(10) Patent No.: US 6,850,039 B2
(45) Date of Patent: Feb. 1, 2005

(54) BATTERY PACK AND A BATTERY CHARGING/DISCHARGING CIRCUIT INCORPORATING THE SAME

(75) Inventor: Serban-Mihai Popescu, Campbell, CA (US)

(73) Assignee: O2Micro International Limited, Grand Cayman (KY)

( * ) Notice: Subject to any disclaimer, the term of this patent is extended or adjusted under 35 U.S.C. 154(b) by 72 days.

(21) Appl. No.: 10/428,657

(22) Filed: May 2, 2003

(65) Prior Publication Data

US 2004/0217737 A1 Nov. 4, 2004

(51) Int. Cl.$^7$ ................... H01M 10/44; H01M 10/46
(52) U.S. Cl. ........................... 320/134; 320/136
(58) Field of Search ..................... 320/121, 125, 320/127, 128, 134, 136

(56) References Cited

U.S. PATENT DOCUMENTS 5,789,900 A * 8/1998 Hasegawa et al. .......... 320/132
2004/0021440 A1 * 2/2004 Pannwitz ................... 320/100

* cited by examiner

Primary Examiner—Edward H. Tso
(74) Attorney, Agent, or Firm—Grossman, Tucker, Perreault & Pfleger, PLLC (57) ABSTRACT

A battery pack including at least one battery cell; first and second battery selector switches configured to allow selective coupling of the battery cell to a power source or load for charging/discharging the battery cell; and a switch controller. The switch controller closes both of the switches to allow charging/discharging of the battery cell when a minimum charge/discharge current level is reached. A battery charging/discharging circuit including such a battery pack and a method of controlling the charging and discharging a battery cell in a battery pack are also provided.

50 Claims, 5 Drawing Sheets

BATTERY PACK AND A BATTERY CHARGING/DISCHARGING CIRCUIT INCORPORATING THE SAME

FIELD OF THE INVENTION

The present invention generally relates to power management in electronic devices, and, more particularly, to a battery pack and a battery charging/discharging circuit incorporating the same.

BACKGROUND OF THE INVENTION

Rechargeable batteries, i.e., secondary batteries, have been widely used to provide electrical power for driving battery powered electronic appliances. Battery powered electronic appliances may include, by way of example, portable radio cassette players, portable computers, camcorders, digital cameras, cellular telephones, PDAs and other devices. Alkaline batteries for such appliances, such as nickel cadmium (Ni—Cd) or nickel metal hydride (Ni—MH) batteries, are well known. Recently, lithium ion (Li-ion) batteries with an organic electrolytic cell have gained popularity in high-end portable electronic devices because they exhibit high energy density, low temperature characteristics, and stable storage capability.

Rechargeable batteries require an electronic charger for recharging depleted batteries. A charger may be configured as internal charger circuit incorporated into the battery-powered appliance. An internal charger typically begins charging the battery whenever the device is powered by an alternating current (AC) source, and allows discharge of the battery when the AC source is removed.

Typically, internal charging circuits are configured to include protection against an overcurrent condition at the battery. For example, when an AC source is applied to the circuit and the battery is discharging, the instantaneous current through the battery can exceed safe or desired levels. A battery including an electrolytic cell can explode in an overcurrent condition, while other batteries may be seriously damaged. Also, an internal charging circuit may be configured to prevent cross-conduction between batteries in a multiple battery system. Cross-conduction between batteries can occur if the charging circuit allows two or more batteries to simultaneously conduct, and can result in inefficient or ineffective power transfer to system components.

In view of these considerations, charging circuit topologies typically require numerous components, and are thus costly to manufacture. However, known battery charging circuit topologies, especially those adapted for use with multiple batteries, achieve battery charging/discharging using redundant circuit components. This adds to the cost and complexity of the system, and creates inefficiency in power transfer to system components.

Thus, there is a need for a battery charging circuit topology allowing low component count and efficient power transfer in battery powered electronic appliances.

SUMMARY OF THE INVENTION

In one embodiment, a battery pack consistent with the invention includes at least one battery cell; first and second switches configured to allow selective coupling of the battery cell to a load for discharging the battery cell and to allow selective coupling of the battery cell to a power source for charging the battery cell; and a switch controller. The switch controller is configured to close both of the switches to allow discharging of the battery cell when a discharging current through the cell reaches a predetermined minimum discharge current level and to close both of the switches to allow charging of the battery cell when a charging current through the cell reaches a predetermined minimum charge current level.

In one embodiment, a battery charging/discharging circuit consistent with the invention includes: a plurality of battery packs consistent with the invention; a discharge switch for selectively coupling the battery packs to a load along a discharging path for discharging the battery packs; and a charge switch for selectively coupling the battery packs to a power source along a charging path.

A method of controlling the charging and discharging a battery cell in a battery pack consistent with the invention includes: providing first and second battery selector switches in the battery pack; closing the first and second battery selector switches to charge the battery pack when a predetermined charge current through the battery cell is achieved; and closing the first and second battery selector switches to discharge the battery pack when a predetermined discharge current through the battery cell is achieved.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

The present invention will now be described in connection with various exemplary embodiments. Those skilled in the art will, of course, recognize that the embodiments described herein may be implemented in a variety of configurations with a variety of circuit components. It is to be understood, therefore, that the illustrated embodiments are provided only by way of explanation, not of limitation.

Figure 1:
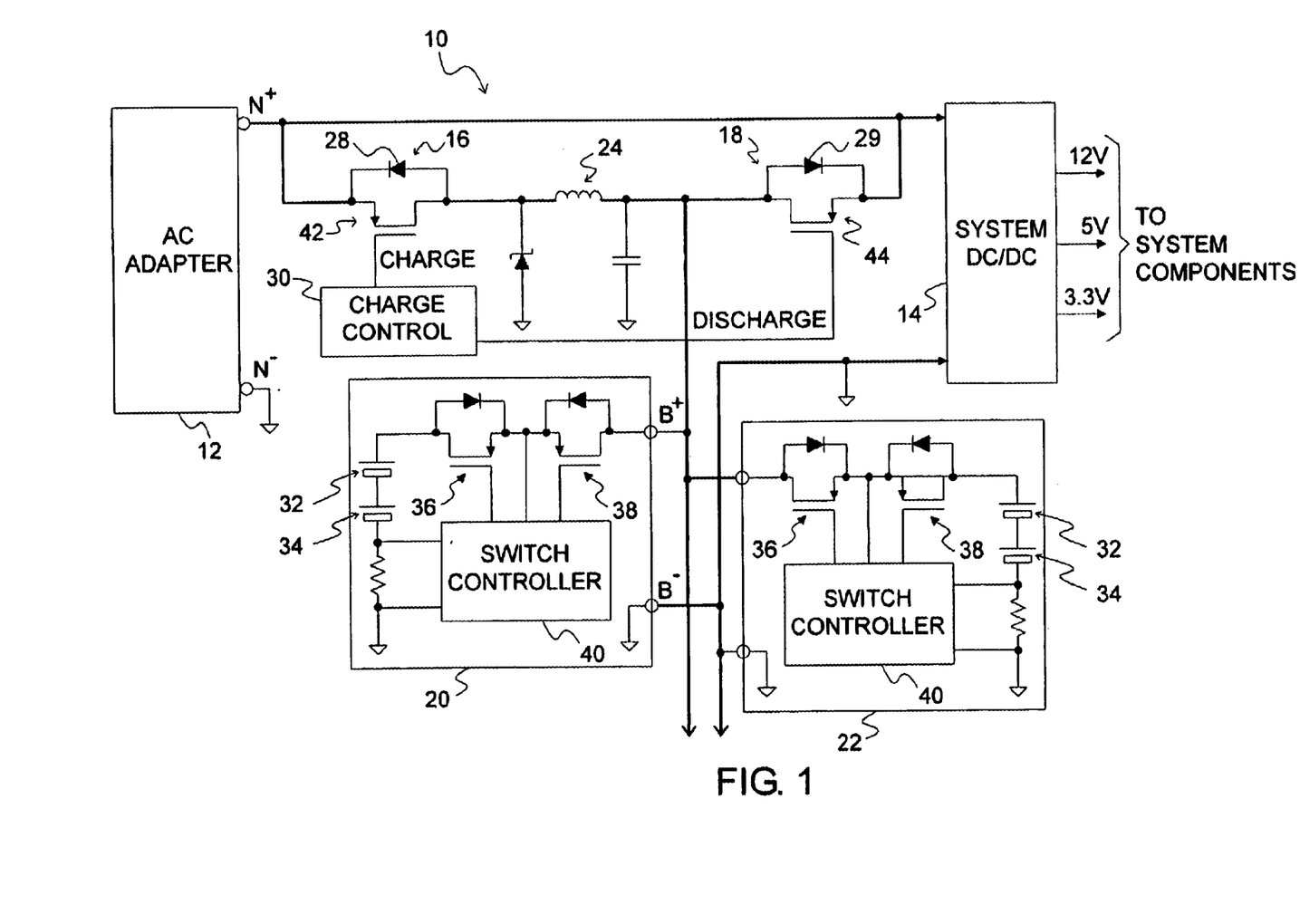
FIG. 1 is circuit diagram of an exemplary battery charging/discharging circuit consistent with the invention.

FIG. 1 illustrates an exemplary battery charging/discharging circuit 10 consistent with the invention. The illustrated circuit includes battery packs 20, 22, a buck converter circuit 24 for charging the battery cells in the battery packs, switches 16, 18, and a charge control circuit 30. Each battery pack 20, 22 in the illustrated embodiment includes two battery cells 32,34, battery selector switches 36,38, and a battery selector switch controller 40 for selectively controlling the state of battery selector switches 36,38. Of course, those skilled in the art will recognize that any number of battery packs may be provided, and that any number of cells may be provided in each battery pack.

A system DC/DC converter 14 may be connected to the circuit 10 for supplying one or more DC source voltages (e.g., 12V, 5V, 3.3V, etc.) to system components of a battery powered electronic appliance. In the illustrated embodiment, the converter 14 is coupled through the circuit 10 to an AC adapter 12 and to the battery packs 20, 22. Input to the converter from the AC adapter or the battery packs is supplied in response to operation of the circuit 10.

As an overview, if the AC/DC adapter 12 is present and supplying power to the system, the charge control circuit 30 closes switch 16 to permit the AC/DC adapter to provide charging current to the battery packs 20, 22 while supplying power to the system through converter 14. The switch controller 40 associated with each battery pack 20,22 controls the associated switches 36,38 to enable charging of the cells 32,34 while preventing cross-conduction between the battery packs 20,22. When the AC adapter 12 is removed or not present, the charge control circuit 30 opens switch 16 and closes switch 18 to enable discharge of the battery packs for supplying current to the converter 14. The switch controller 40 associated with each battery pack 20,22 controls the associated switches 36,38 to enable discharging of the cells 32,34 while preventing cross-conduction between the battery packs 20,22. These features are described in more detail below.

With continued reference to FIG. 1, the charger control circuit 30 may generally determine whether an AC adapter 12 is connected to the circuit 10 for providing current to the converter 14. When an AC adapter is present, as determined for example from the voltage at the N+ node, the circuit 30 may generate a charge signal for closing switch 16. Closure of switch 16 establishes a charge path for the adapter 12 to supply power to the buck converter 24, which generates a DC charging current from the power source for charging the battery packs 20, 22. A discharge signal from the circuit 30 may maintain the switch 18 in an open state when the battery packs are charging.

When an AC adapter 12 is not present, the charge control circuit 30 may provide a discharge signal for closing the switch 18. Closure of switch 18 establishes a discharge path for the battery packs 20, 22 to supply power to the converter 14. The charge signal from circuit 30 may maintain the switch 16 in an open state when the battery packs are discharging.

A variety of circuit configurations for generating a charge/discharge signal in response to the presence or absence of an AC adapter will be known to those skilled in the art. For example, a comparator may be provided for comparing the battery voltage $V_{B+}$ at node B+ with the voltage $V_{N+}$ at node N+. If $V_{N+} > V_{B+}$ then the comparator may provide a charge signal for closing the switch 16, since this indicates that an adapter is present. Otherwise, the comparator may provide a discharge signal for closing the switch 18.

In the illustrated exemplary embodiment, the switches 16,18 are configured as transistors 42, 44 with body diodes 28,29, respectively. Of course, the switches 16,18 may be provided in a variety of other configurations known to those skilled in the art. The body diodes 28,29 are in reverse bias with respect to the power adapter 12, thereby ensuring that no leakage current is fed into the battery packs 20,22. Thus, to allow charging of the battery in the illustrated embodiment, the charge signal causes the transistor 42 turn on (i.e. conduct), while the discharge signal leaves the transistor 44 off (i.e. in a non-conduction state). To allow discharging of the batteries, the discharge signal causes the transistor 44 to turn on, while the charge signal leaves the transistor 42 off.

As will be described in greater detail below, the switch controller 40 in each battery pack controls operation of the associated switches 36,38 to enable charging or discharging of the battery packs, while preventing cross-conduction. When the charge signal is high, the switch controller 40 may allow charging of a battery pack as long as a charging current through the associated cells 32,34 exceeds a predetermined level. The switch controller in the battery packs wherein charge current does not exceed the predetermined level enter a "diode mode" to prevent cross-conduction of current between battery packs during charging.

When the discharge enable signal is high, the switch controller 40 may allow discharging of one of the battery packs as long as the discharge current through the associated cells 32, 34 exceeds a predetermined level. The switch controller in the battery packs wherein discharge current does not exceed the pre-determined level enter a "diode mode" to prevent cross-conduction of current from the discharging battery pack into battery packs that are not discharging.

Figure 2:
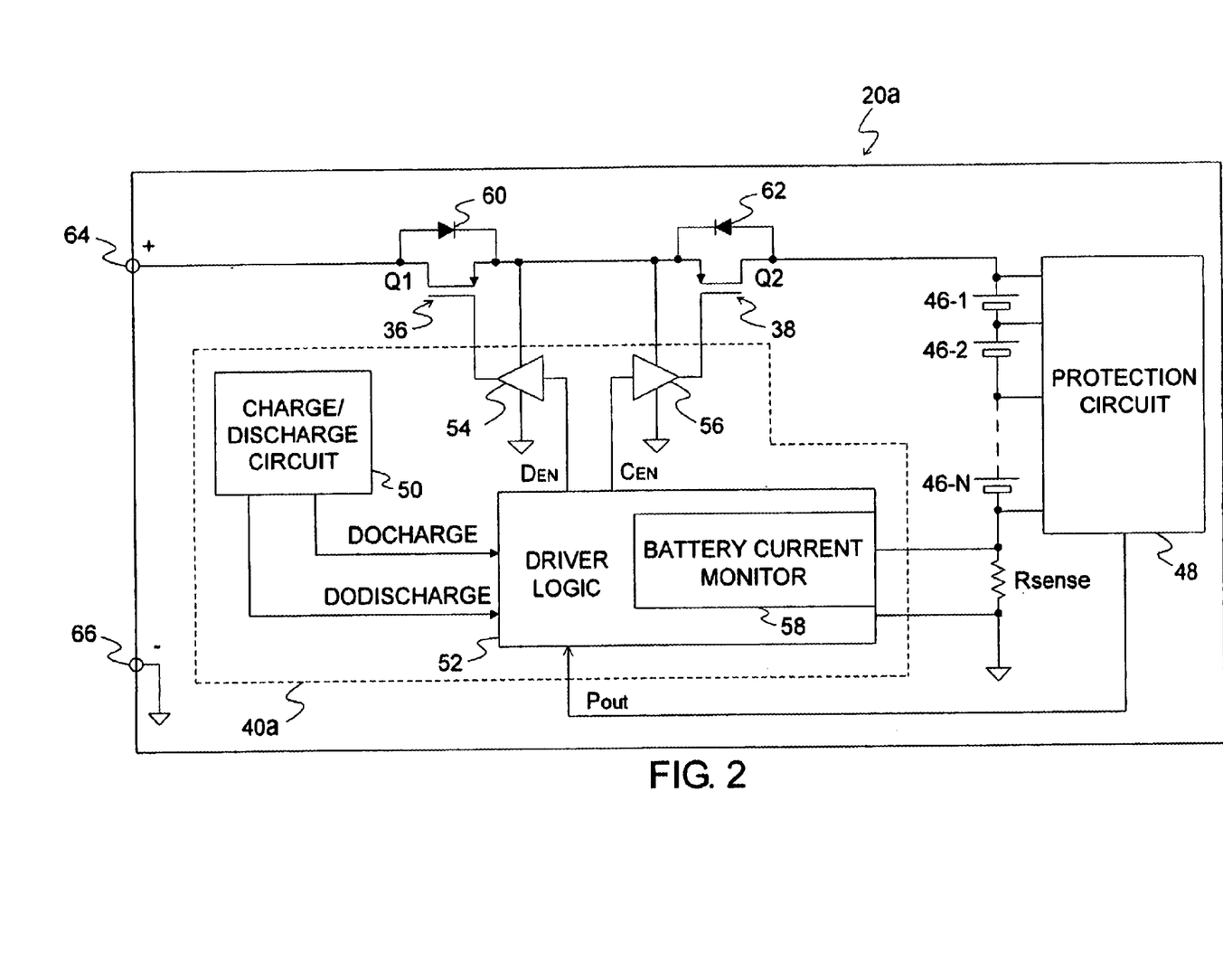
FIG. 2 is circuit diagram of an exemplary battery pack consistent with the invention.

Turning now to FIG. 2, there is illustrated an exemplary battery pack 20a consistent with the invention. The battery pack includes battery selector switches 36,38, battery cells 46-1, 46-2 . . . 46-N, a sense resistor $R_{sense}$, switch controller 40a, and a protection circuit 48. In the illustrated embodiment, the switch controller 40a includes, a charge enable circuit 50, driver logic 52, drivers 54,56, and a battery current monitor 58. The switches 36,38 are configured as FET transistors Q1, Q2 with body diodes 60, 62, respectively. The source of Q1 is coupled to the source of Q2, and the drain of Q1 is coupled to the positive battery terminal while the drain of Q2 is coupled to the battery cells. The body diode 62 is in forward bias with the battery cells 46-1, 46-2 . . . 46-N, but in reverse bias with the battery terminals 64,66, while body diode 60 is in forward bias with the battery terminals, but in reverse bias with the battery cells.

One output from the battery current monitor 58 indicates whether a charge current through the battery cells has exceeded a predetermined level, and another output indicates whether a discharge current through the battery cells has exceeded a predetermined level. Outputs from the protection circuit 48 indicate whether the battery cells are at or near a maximum tolerated charge, and may indicate whether a maximum current through the battery is reached in either a charge or discharge direction. The switch controller 40a may control the switches 36,38 in response to a charge or discharge signal, the outputs of the battery current monitor 58, and the outputs of the protection circuit 48.

Whenever a battery is charging or discharging, the switch controller 40 causes both Q1 and Q2 to conduct (i.e. closes both switches 36,38). For example, when charging, both Q1 and Q2 may conduct only if a battery charge signal (doCharge) is high, the charging current has reached a predetermined level as indicated by the battery current monitor 58, and the battery cells are not at or near a maximum tolerated charge or the battery current has not reached a maximum as indicated by the protection circuit 48. When discharging, both Q1 and Q2 may conduct only if a battery discharge signal (doDischarge) is high and the discharge current reaches the predetermined level as indicated by the battery current monitor 58.

The predetermined levels for the charge current and discharge current are set to prevent cross-conduction between battery packs during charging or discharging. For example, assume a two battery system including battery A and battery B where the power adapter 12 is removed. At the time the adapter 12 is removed, in the absence of cross-conduction protection, both batteries may attempt to supply power to the system. However, if battery A has a greater potential than battery B, there may be cross conductance from battery A into battery B. Consistent with the present invention, however, this will cause a negative current through battery B, which, when added to the battery current, will cause the total current through $R_{sense}$ monitored by the battery current monitor 58 for battery B to fall below the threshold value. In response, the switch controller would place Q2 for battery B in an open state. With Q2 open, cross-conduction current cannot be supplied from battery A to battery B since body diode 62 is in reverse bias to the battery terminals.

When charging in the absence of cross-conduction protection, battery A may have a greater potential than battery B, resulting in cross-conduction from battery A to battery B. Consistent with the present invention, however, this will cause a reduced a positive current through battery A, which when added to the battery current, will cause the total current through $R_{sense}$ monitored by the battery current monitor 58 for battery A to fall below the threshold value. In response, the switch controller 40 would place Q1 for battery A in an open state. With Q1 open, cross-conduction current from battery A to battery B cannot be supplied since the body diode 60 is in reverse bias to the battery cells.

The battery charge signal and battery discharge signal may be received from an external source, such as the charge control circuit 30. In one embodiment, the battery charge signal may be the charge signal from the charge control circuit 30 and the battery discharge signal may be the discharge signal from the charge control circuit 30. In the illustrated embodiment, however, the battery charge signal (doCharge) and battery discharge signal (doDischarge) are generated by the charge/discharge circuit 60 resident in the battery pack. The charge/discharge circuit 60 may generate the charge and discharge signals in the manner described above with respect to the charge control circuit.

Figure 3:
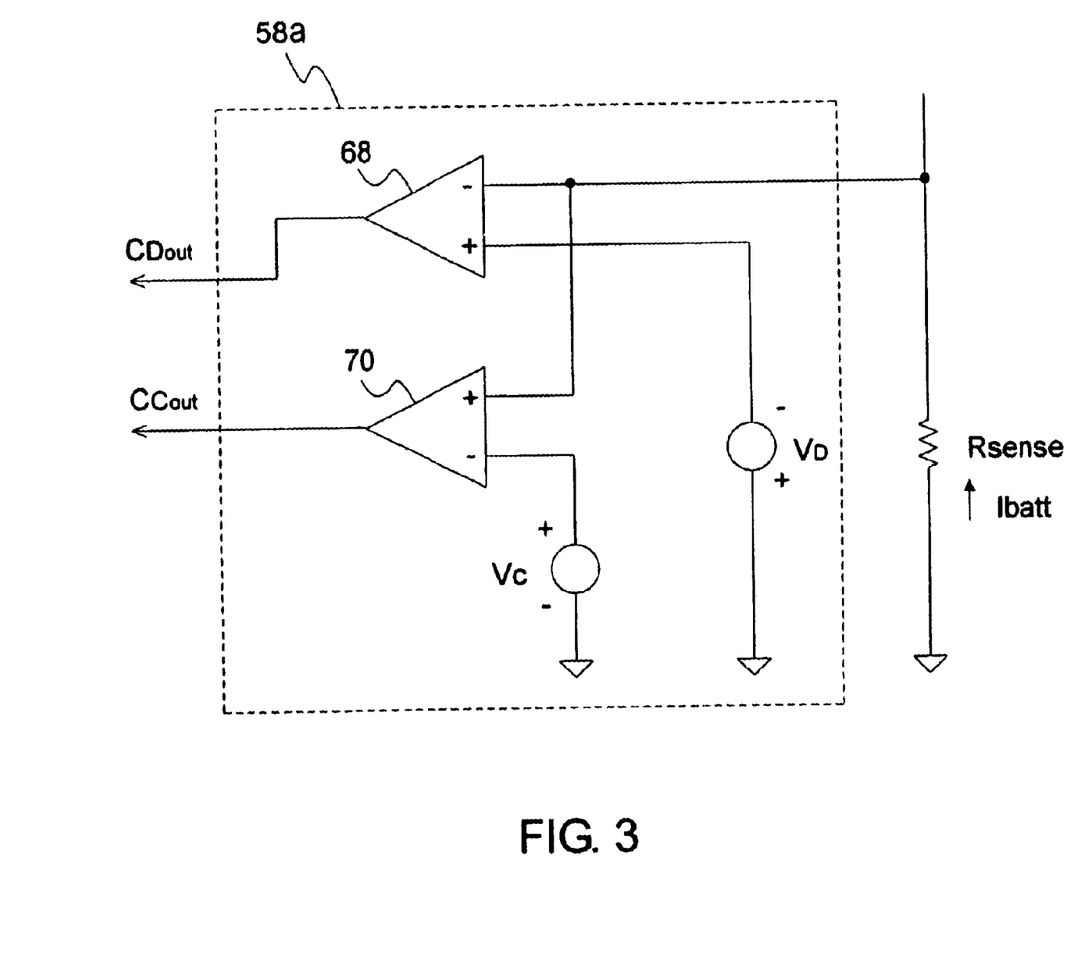
FIG. 3 is a circuit diagram of an exemplary battery current monitor for a battery pack consistent with the invention.

Those skilled in the art will recognize that the battery current monitor 58 may take a variety of configurations. One example of a battery current monitor 58 useful in connection with the present invention is illustrated in FIG. 3. In the illustrated embodiment, the battery current monitor 58a includes a first comparator 68 and second comparator 70, as shown. Comparator 68 compares the voltage $V_{R\text{-}sense}$ across the sense resistor $R_{sense}$ to voltage $V_D$. $V_D$ may be chosen to equal $I_{Dthresh} \times R_{sense}$. $I_{Dthresh}$ may be chosen as the threshold discharge current for that battery pack. In one embodiment, $I_{Dthresh}$ may be about 3 A. It should be understood, however, that $I_{Dthresh}$ may vary depending the system configuration. If $V_D > V_{R\text{-}sense}$, the comparator 68 generates high output control signal $C_{Dout}$ indicating that the threshold discharge current has been met. Conversely, if $V_D < V_{R\text{-}sense}$, the comparator 68 generates low output control signal $C_{Dout}$ indicating that the threshold discharge current has not been met.

The second comparator 70 of the current monitor 58 compares the voltage $V_{R\text{-}sense}$ across sense resistor $R_{sense}$, with a predetermined threshold voltage $V_C$. $V_C$ is a threshold voltage, indicative of a battery charge current, and, in one embodiment, can be generalized by a threshold current $I_{Cthresh} \times R_{sense}$. In one embodiment, $I_{Cthresh}$ may be about 0.3 A. It should be understood, however, that $I_{Cthresh}$ may vary depending the type of battery cells used. $I_{Cthresh}$ may thus be a programmable value to allow adjustment depending on battery type. If $V_{R\text{-}sense} > V_C$, the comparator 70 generates high output control signal $C_{Cout}$ indicating that the threshold charge current has been met. Conversely, if $V_{R\text{-}sense} < V_C$, the comparator 70 generates a low output control signal $C_{Cout}$ indicating that the threshold charge current has not been met.

The protection circuit 48 may provide an output to indicate whether the battery cells 46-1, 46-2 . . . 46-N are at near or at their maximum tolerated charge. The protection circuit may also indicate whether a maximum charging current through the battery cells 46-1, 46-2 . . . 46-N has been reached and/or a whether overcurrent condition caused by a short across the battery terminals has occurred. Those skilled in the art will recognize that the protection circuit may be provided in a variety of embodiments.

Figure 4:
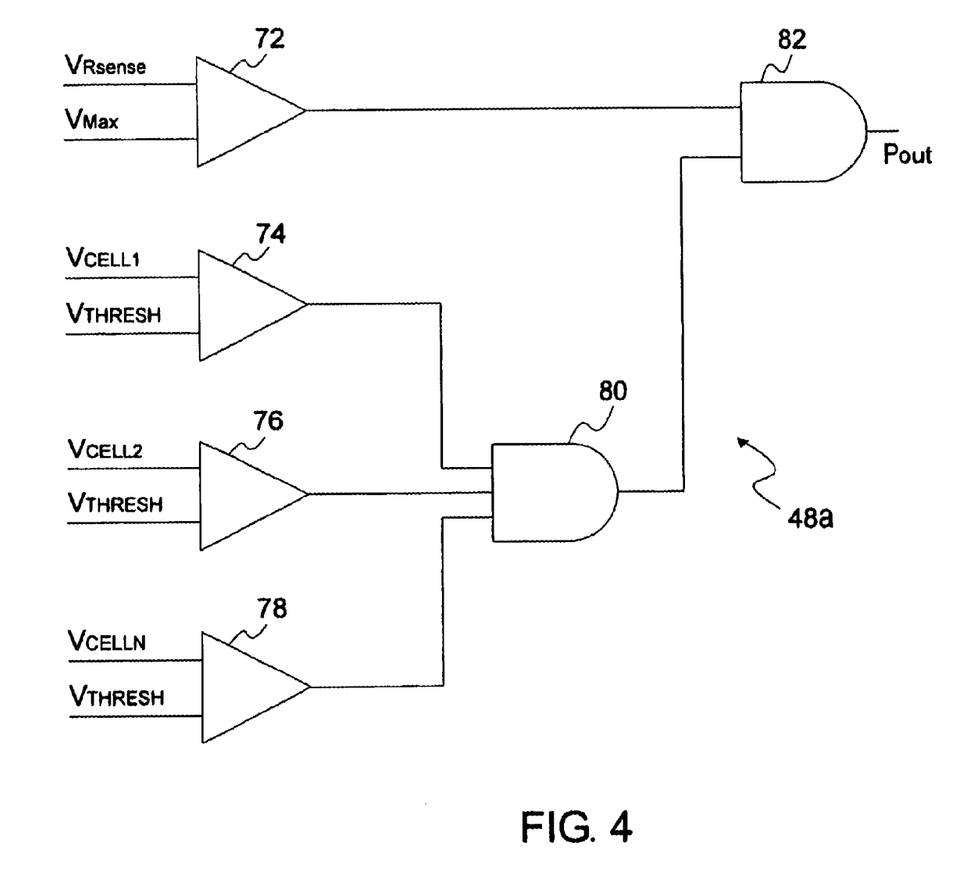
FIG. 4 is a circuit diagram of an exemplary protection circuit for a battery pack consistent with the invention.

FIG. 4 illustrates one exemplary embodiment 48a of a protection circuit. The illustrated embodiment includes a plurality of comparators 74, 76, and 78 (one for each cell, 46-1, 46-2 . . . 46-N, of the battery), a comparator 72, and an AND gates 80 and 82. Comparators 74, 76 and 78 monitor the individual battery cell voltages, $V_{cell1}$, $V_{cell2}$ . . . $V_{celln}$, respectively, and compare the cell voltages to a programmable threshold voltage $V_{Thresh}$. For typical Lithium ion batteries, the maximum charge tolerated on any cell may be about 4.300 volts. Thus, $V_{Thresh}$ may be a value below this maximum voltage. For example, $V_{Thresh}$ can be programmed at 4.200 Volts (+/−50 mV.). Of course, this is just an example, and $V_{Thresh}$ can be set to any appropriate amount, as required. A high precision voltage generator (not shown) may be used to generate $V_{Thresh}$. If $V_{Thresh}$>each of $V_{cell1}$, $V_{cell2}$ . . . $V_{celln}$, then comparators 74, 76 and 78 each generate a high output signal that is fed into AND gate 80. The output of AND gate 80 will, of course, be likewise high. If any of $V_{cell1}$, $V_{cell2}$ . . . $V_{celln}$ are>$V_{Thresh}$, then the output of AND gate 80 is low. The output of AND gate 80 is provided at the one input of AND gate 82.

Comparator 72 monitors the current through $R_{sense}$, and compares the voltage $V_{Rsense}$ across $R_{sense}$ to a programmable reference voltage $V_{Max}$ representative of the maximum discharge current through $R_{sense}$ for preventing an overcurrent condition, e.g. in the event of a short across the battery terminals. If $V_{Max}$>$V_{Rsense}$ then comparator 72 generates a high output signal which is fed into AND gate 82. Otherwise, the output of comparator 72 is low. The output $P_{out}$ of the protection circuit 48a in the illustrated embodiment is thus high only when the battery cell voltages have not reached a maximum and there is no overcurrent condition through the battery cells.

Figure 5:
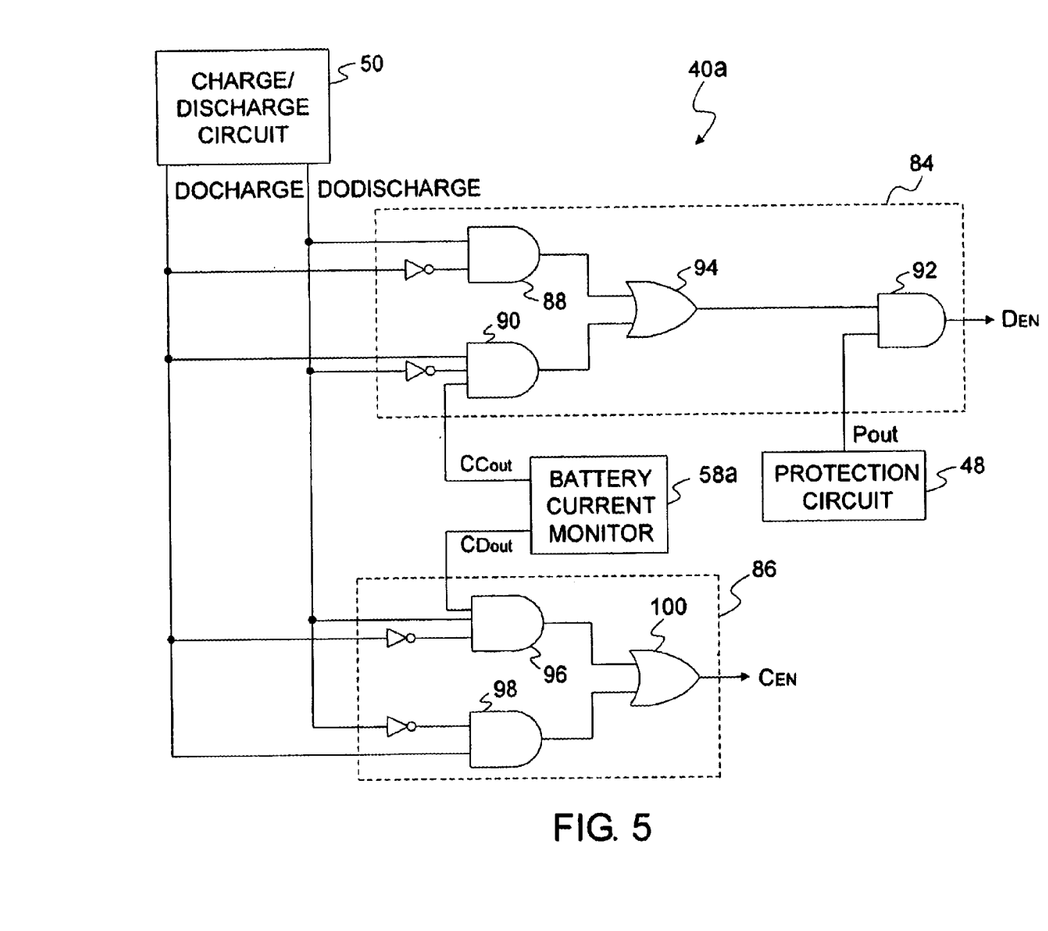
FIG. 5 is a circuit diagram of an exemplary switch controller for a battery pack consistent with the invention.

In an exemplary embodiment including a battery monitor 58 as shown in FIG. 3 and a protection circuit 48a as shown in FIG. 5, therefore, the switch controller 40 may turn both Q1 and Q2 on to charge the battery only if the charge signal (docharge) is high, $C_{Cout}$ is high, and the protection circuit output $P_{out}$ is high. When discharging, both Q1 and Q2 may conduct only if a discharge signal (doDischarge) is high and $C_{Dout}$ is high. Of course, the switch controller may be implemented in a variety of configurations using discrete components and/or a pre-programmed processor.

In one exemplary embodiment 40a, the switch controller may include simple logic gates, as illustrated in FIG. 4. The logic gates may be configured to provide a discharge enable circuit 84 and a charge enable circuit 86. With reference to the embodiment illustrated in FIG. 2, the discharge enable circuit may control conduction of Q1 by providing a discharge enable signal $D_{En}$ to driver 54, and the charge enable circuit controls conduction of Q2 by providing a charge enable signal $C_{En}$ to driver 56. Both Q1 and Q2 conduct when a battery pack is charging or discharging.

As shown, the discharge enable circuit 84 includes AND gates 88, 90, 92, and OR gate 94. The doDischarge signal from the charge/discharge circuit 50 is provided at one input of AND gate 88, and the doCharge signal is inverted and provided at the other input of AND gate 88. The output of the AND gate is, of course, high when doDischarge is high (i.e. the adapter 12 is not present) and doCharge is low. The doCharge signal is provided at a first input of AND gate 90, the doDischarge signal is inverted and provided at a second input of AND gate 90, and the $C_{Cout}$ signal from the battery current monitor 58a is provided at a third input of AND gate 90. The output of AND gate 90 is thus high when doCharge is high (i.e. the adapter 12 is present), doDischarge is low, and $C_{Cout}$ is high indicating that the threshold charge current has been reached.

The outputs of AND gates 88,90 are provided at respective inputs to OR gate 94. The output of OR gate 94 is provided at a first input of AND gate 92, and the output $P_{Out}$ of the protection circuit 48 is provided at a second input of AND gate 92. The AND gate 92 provides a high discharge enable signal $D_{En}$ when the output of OR gate 94 is high and the output $P_{Out}$ of the protection circuit is high indicating that the maximum tolerated battery cell voltages have not been reached. The $D_{En}$ signal is provided at the input of driver 54, which drives the gate of Q1 to place Q1 in conduction when $D_{En}$ is high.

Similarly, the charge enable circuit 86 includes AND gates 96,98, and OR gate 100. The doCharge signal from the charge/discharge circuit 50 is provided at one input of AND gate 98, and the doDischarge signal is inverted and provided at the other input of AND gate 98. The output of the AND gate 98 is high when doCharge is high (i.e. the adapter 12 is present) and doDischarge is low. The doDischarge signal is provided at a first input of AND gate 96, the doCharge signal is inverted and provided at a second input of AND gate 96, and the $C_{Dout}$ signal from the battery current monitor 58a is provided at a third input of AND gate 96. The output of AND gate 96 is thus high when doDischarge is high (i.e. the adapter 12 is not present), doCharge is low, and $C_{Dout}$ is high indicating that the threshold discharge current has been reached.

The outputs of AND gates 96,98 are provided at respective inputs to OR gate 100. The OR gate 100 provides a high charge enable signal $C_{En}$ when the output of either AND gate 96,98 is high. The $C_{En}$ signal is provided at the input of driver 56, which drives the gate of Q2 to place Q2 in conduction when $C_{En}$ is high.

Battery Charging

Operation of an exemplary circuit consistent with the invention will now be described in connection with the exemplary embodiments illustrated in FIGS. 1 and 2. As noted above, the state of switch 16 is controlled by the charge control circuit 30. When charging, the AC adapter 12 is present, and the charge control circuit 30 closes the switch 16 to provide a charge path for the adapter 12 to supply power to the buck converter 24, thereby generating a charging current to the battery packs 20,22. Switch 18 is held open (i.e. non-conducting) by the charge control circuit 30, and body diode 29 prevents leakage current from the supply to the battery packs.

Switch controller 40 in a battery pack 20,22 may close switch 38 to allow charging of the battery pack through body diode 60 in response to a charge signal. To prevent cross-conduction, switch 36 may remain open until the battery current monitor output $C_{Cout}$ indicates that the charge current through $R_{sense}$ has reached a predetermined threshold established, for example, by $V_C$ as shown in FIG. 3. With switch 36 open, cross-conduction current through the battery cells is prevented by body diode 60. When the predetermined threshold is reached, both switches 36, 38 close to allow charging. In this configuration, only the battery pack having the lowest potential will charge with both switches 36,38 closed, while the cells in the battery packs having higher potential are prevented from providing cross-conduction current. Also, the output $P_{Out}$ of the protection circuit 48 may allow both switches 36,38 to close only when the battery cell voltages have not reached a maximum and no overcurrent condition exists.

If the charging current falls below the predetermined threshold, the switch controller will again open switch 36. As such, cross conduction is prevented by diode 60. This protects other battery packs and other system components from such cross conduction. One such component that is advantageously protected is the DC to DC buck converter 24. Such a buck converter may otherwise be susceptible to undesirable operation in a boost mode. For instance, since the load served by the DC to DC converter is a battery pack 20, 22 capable of delivering power, the DC to DC converter operating in a boost mode pushes back to the AC adapter 12 power drawn from the battery pack. Eventually this may produce a high voltage on the input to the DC to DC buck converter 24 which may then become damaged due to electrical overstress.

Advantageously, if the charging current falls below the predetermined threshold, the switch controller 40 will open switch 36 and the diode 60 will prevent current from flowing from the battery pack back to the input of the DC to DC converter. As such, opening of the switch 36 disables any operation of the DC to DC converter 24 in a boost mode since boost operation is characterized in this instance by a current flowing from a load (e.g., battery pack) back to the DC to DC converter input.

Battery Discharging

When discharging, the AC adapter 12 is not present, and the charge control circuit 30 closes the switch 18 to provide a discharge path for the battery packs 20, 22 to supply power to the converter 14. Switch 16 may be held open (i.e. non-conducting). The switch controller 40 in a battery pack may close switch 36 to allow discharging through switch 36 and body diode 62 in response to a discharge signal.

To prevent cross-conduction, switch 38 may remain open until the battery current monitor output $C_{Dout}$ indicates that the discharge current through $R_{sense}$ has reached a predetermined threshold established, for example, by $V_D$ as shown in FIG. 3. With switch 38 open, cross-conduction current through the battery cells is prevented by body diode 62. When the predetermined threshold is reached, both switches 36,38 close to allow discharging. In this configuration, only the battery pack having the highest potential will discharge with both switches 36,38 closed, while the cells in the other battery packs are prevented from receiving cross-conduction current.

Advantageously, therefore, there is provided a battery pack and system wherein cross-conduction between individual battery packs during charging and discharging is prevented by switch controller 40 and battery selector switches 36, 38 resident on the individual battery packs 20, 22. Also, providing the battery selector switches 36,38 in the battery pack minimizes the number of switches in the power path between the battery cells and the AC adapter 12 or the system components. For example, in a two battery system, as illustrated in FIG. 1, only six total power switches are required, and the power path between the cells of any battery pack and the AC adapter or the system converter includes only three power switches. Redundancy in components is thus minimized, thereby reducing power losses and system cost and complexity.

Although various embodiments are specifically illustrated and described herein, it will be appreciated that modifications and variations of the present invention are covered by the above teachings, and are within the purview of the appended claims without departing from the spirit and intended scope of the invention. Also, it will be appreciated that the functionality described for the embodiments of the invention may be implemented in hardware, software, or a combination of hardware and software, using well-known techniques.

If in software, a processor and a machine-readable medium are required. The processor can be any type of processor capable of providing the speed and functionality required by the embodiments of the invention. Machine-readable media include any media capable of storing instructions adapted to be executed by a processor. Examples of such media include, read-only memory (ROM), random-access memory (RAM), programmable ROM, erasable programmable ROM, electronically erasable programmable ROM, dynamic RAM, magnetic disk (e.g. floppy disk and hard drive), optical disk (e.g. CD-ROM), and any other devices that can store digital information.

As used herein, the phrase "adapted to be executed by a processor" is meant to encompass instructions stored in a compressed and/or encrypted format, as well as instructions that have to be compiled or installed by an installer before being executed by the processor. Further, the processor and machine-readable medium may be part of a larger system that may contain various combinations of machine-readable storage devices through various I/O controllers, which are accessible by the processor and which are capable of storing a combination of computer program instructions and data.

What is claimed is:

1. A battery pack comprising:
   at least one battery cell;
   first and second switches configured to allow selective coupling of said battery cell to a load for discharging said battery cell and to allow selective coupling of said battery cell to a power source for charging said battery cell; and
   a switch controller configured to close both of said switches to allow discharging of said battery cell when a discharging current through said cell reaches a predetermined minimum discharge current level and to close both of said switches to allow charging of said battery cell when a charging current through said cell reaches a predetermined minimum charge current level.

2. A battery pack according to claim 1, wherein said battery pack comprises a plurality of said battery cells.

3. A battery pack according to claim 1, wherein said first switch comprises a first transistor and said second switch comprises a second transistor, and wherein said switch controller is configured to close said first and second switches by placing said first and second transistors in a conducting state.

4. A battery pack according to claim 3, wherein said battery pack further comprises a first diode in parallel with said first transistor, and said second diode in parallel with said second transistor.

5. A battery pack according to claim 4, wherein said first diode is in reverse bias with said at least one battery cell, and said second diode is in forward bias with said at least one battery cell.

6. A battery pack according to claim 5, wherein said first and second transistors are field effect transistors, and wherein a source of said first transistor is coupled to a source of said second transistor.

7. A battery pack according to claim 6, wherein a drain of said first transistor is coupled to a positive battery terminal, and wherein a drain of said second transistor is coupled to said at least one battery cell.

8. A battery pack according to claim 7, wherein said switch controller is configured to provide first and second outputs, said first output being coupled to a gate of said first transistor for controlling a conduction state of said first transistor, and said second output being coupled to a gate of said second transistor for controlling a conduction state of said second transistor.

9. A battery pack according to claim 1, wherein said switch controller comprises a battery current monitor for monitoring said discharging current and said charging current, and wherein said switch controller is configured to close said switches in response to an output of said battery current monitor.

10. A battery pack according to claim 9, wherein battery current monitor comprises:
    a first comparator configured to compare a discharge reference voltage with a voltage across a sense impedance in series with said at least one battery cell; and a second comparator configured to compare a charge reference voltage with said voltage across said sense impedance.

11. A battery pack according to claim 1, wherein said switch controller is configured to receive a discharge signal and a charge signal, and wherein said switch controller is configured to close a first one of said switches in response to said discharge signal when said discharging current has not reached said discharge current level and to close both of said switches when said discharging current through said cell reaches said predetermined level, and wherein said switch controller is configured to close a second one of said switches in response to said charge signal when said charging current has not reached said predetermined level and to close both of said switches when said charging current through said cell reaches said charge current level.

12. A battery pack according to claim 11, wherein said switch controller comprises a charge/discharge circuit for providing said discharge signal and said charge signal.

13. A battery pack according to claim 1, wherein said battery pack comprises a protection circuit for monitoring said a voltage across said cell and providing an output indicating when a maximum cell voltage is reached, and wherein said switch controller is configured to close both of said switches when said charging current through said cell reaches said minimum charge current level and when said maximum cell voltage has not been reached.

14. A battery pack according to claim 13, wherein said output comprises an output of a comparator configured to compare a reference voltage with a voltage said at least one battery cell.

15. A battery pack according to claim 1, wherein said battery pack comprises a protection circuit for monitoring said discharging current and providing an output indicating when a maximum discharge current is reached, and wherein said switch controller is configured to close both of said switches when said discharging current through said cell reaches said discharge current level and when said maximum discharge current has not been reached.

16. A battery pack according to claim 15, wherein said output comprises an output of a comparator configured to compare a reference voltage with a voltage across a sense impedance in series with said at least one battery cell.

17. A battery pack comprising:
    at least one battery cell;
    first and second transistors configured to allow selective coupling of said battery cell to a load for discharging said battery cell and to allow selective coupling of said battery cell to a power source for charging said battery cell;

a first diode in parallel with said first transistor and in reverse bias with said battery cell, and a second diode parallel with said second transistor and in forward bias with said battery cell; and a switch controller configured to cause said first and second transistors to conduct for allowing discharging of said battery cell in response to a discharge signal and a discharge current signal, said discharge current signal comprising a first output of a battery current monitor indicating that a discharge current through said cell has reached a predetermined minimum discharge current level;

said switch controller being further configured to cause said first and second transistors to conduct for allowing charging of said battery cell in response to a charge signal an a charge current signal, said charge current signal comprising a second output of said battery current monitor indicating that a charge current through said cell has reached a predetermined minimum charge current level.

18. A battery pack according to claim 17, wherein said battery pack comprises a plurality of said battery cells.

19. A battery pack according to claim 17, wherein said first and second transistors are field effect transistors, and wherein a source of said first transistor is coupled to a source of said second transistor.

20. A battery pack according to claim 19, wherein a drain of said first transistor is coupled to a positive battery terminal, and wherein a drain of said second transistor is coupled to said at least one battery cell.

21. A battery pack according to claim 20, wherein said switch controller is configured to provide first and second outputs, said first output being coupled to a gate of said first transistor for controlling a conduction state of said first transistor, and said second output being coupled to a gate of said second transistor for controlling a conduction state of said second transistor.

22. A battery pack according to claim 21, wherein said first output comprises an output of a first comparator configured to compare a discharge reference voltage with a voltage across a sense impedance in series with said at least one battery cell; and said second output comprises an output of a second comparator configured to compare a charge reference voltage with said voltage across said sense impedance.

23. A battery pack according to claim 17, wherein said switch controller comprises a charge/discharge circuit for providing said discharge signal and said charge signal.

24. A battery charging/discharging circuit comprising:
a plurality of battery packs, each of said battery packs comprising, at least one battery cell,
first and second battery selector switches configured to allow selective coupling of said battery cell to a load for discharging said battery cell and to allow selective coupling of said battery cell to a power source for charging said battery cell, and
a switch controller configured to close said first and second battery selector switches to allow discharging of said battery cell when a discharging current through said cell reaches a predetermined minimum discharge current level and to close said first and second battery selector switches to allow charging of said battery cell when a charging current through said cell reaches a predetermined minimum charge current level;
a discharge switch for selectively coupling said battery packs to said load along a discharging path for discharging said battery packs; and
a charge switch for selectively coupling said battery packs to said power source along a charging path.

25. A circuit according to claim 24, said circuit further comprising a charge control circuit configured to selectively control the conduction state of said discharge switch and said charge switch in response to a control signal indicative of the presence of said power source.

26. A circuit according to claim 24, wherein said charge switch comprises a first transistor and a first diode in parallel with said first transistor, said first diode being in reverse bias with said power source, and wherein said discharge switch comprises a second transistor and a second diode in parallel with said second transistor, said second diode being in reverse bias with said power source.

27. A circuit according to claim 24, wherein said power source includes an AC/DC adapter.

28. A circuit according to claim 24, wherein said charge path comprises a converter circuit for generating a DC charging current from said power source.

29. A circuit according to claim 28, wherein said converter circuit includes a buck converter circuit comprising an inductor coupled to said charge switch and said battery packs, a capacitor coupled to said inductor and said battery packs, and a diode coupled to said inductor and said charge switch.

30. A circuit according to claim 24, wherein at least one of said battery packs comprises a plurality of said battery cells.

31. A circuit according to claim 24, wherein said first battery selector switch comprises a first transistor and said second battery selector switch comprises a second transistor and wherein said switch controller is configured to close said first and second battery selector switches by placing said first and second transistors in a conducting state.

32. A circuit according to claim 31, wherein each said battery pack further comprises a first diode in parallel with said first transistor, and said second diode in parallel with said second transistor.

33. A circuit according to claim 32, wherein said first diode is in reverse bias with said at least one battery cell, and said second diode is in forward bias with said at least one battery cell.

34. A circuit according to claim 33, wherein said first and second transistors are field effect transistors, and wherein a source of said first transistor is coupled to a source of said second transistor.

35. A circuit according to claim 34, wherein a drain of said first transistor is coupled to a positive battery terminal, and wherein a drain of said second transistor is coupled to said at least one battery cell.

36. A circuit according to claim 35, wherein said switch controller is configured to provide first and second outputs, said first output being coupled to a gate of said first transistor for controlling a conduction state of said first transistor, and said second output being coupled to a gate of said second transistor for controlling a conduction state of said second transistor.

37. A circuit according to claim 24, wherein said switch controller comprises a battery current monitor for monitoring said discharging current and said charging current, and wherein said switch controller is configured to close said battery selector switches in response to an output of said battery current monitor.

38. A circuit according to claim 37, wherein said battery current monitor comprises: a first comparator configured to compare a discharge reference voltage with a voltage across a sense impedance in series with said at least one battery cell; and a second comparator configured to compare a charge reference voltage with said voltage across said sense impedance.

39. A circuit according to claim 24, wherein said switch controller is configured to receive a discharge signal and a charge signal, and wherein said switch controller is configured to close a first one of said battery selector switches in response to said discharge signal when said discharging current has not reached said discharge current level and to close both of said battery selector switches when said discharging current through said cell reaches said predetermined level, and wherein said switch controller is configured to close a second one of said battery selector switches in response to said charge signal when said charging current has not reached said predetermined level and to close both of said battery selector switches when said charging current through said cell reaches said charge current level.

40. A circuit according to claim 39, wherein said switch controller comprises a charge/discharge circuit for providing said discharge signal and said charge signal.

41. A circuit according to claim 24, wherein at least one of said battery packs comprises a protection circuit for monitoring said a voltage across said cell and providing an output indicating when a maximum cell voltage is reached, and wherein said switch controller is configured to close both of said battery selector switches when said charging current through said cell reaches said minimum charge current level and when said maximum cell voltage has not been reached.

42. A circuit according to claim 41, wherein said output comprises an output of a comparator configured to compare a reference voltage with a voltage said at least one battery cell.

43. A circuit according to claim 24, wherein at least one of said battery packs comprises a protection circuit for monitoring said discharging current and providing an output indicating when a maximum discharge current is reached, and wherein said switch controller is configured to close both of said battery selector switches when said discharging current through said cell reaches said discharge current level and when said maximum discharge current has not been reached.

44. A circuit according to claim 43, wherein said output comprises an output of a comparator configured to compare a reference voltage with a voltage across a sense impedance in series with said at least one battery cell.

45. A method of controlling the charging and discharging a battery cell in a battery pack, said method comprising:
providing first and second battery selector switches in said battery pack;
closing said first and second battery selector switches to charge said battery pack when a predetermined charge current through said battery cell is achieved; and
closing said first and second battery selector switches to discharge said battery pack when a predetermined discharge current through said battery cell is achieved.

46. A method according to claim 45, said method further comprising providing a first diode in parallel with said first switch and a second diode in parallel with said second switch, said first diode being in forward bias with said battery cell and said second diode being in reverse bias with said battery cell.

47. A method according to claim 45, wherein said first switch comprises a first transistor and said second switch comprises a second transistor.

48. A method according to claim 47, wherein said first and second transistors are field effect transistors, and wherein a source of said first transistor is coupled to a source of said second transistor.

49. A method according to claim 48, wherein a drain of said first transistor is coupled to a positive battery terminal, and wherein a drain of said second transistor is coupled to said at least one battery cell.

50. A battery pack comprising:
at least one battery cell;
battery selector switch means for allowing selective coupling of said battery cell to a load for discharging said battery cell and selective coupling of said battery cell to a power source for charging said battery cell; and
switch controller means for closing said battery selector switch means to allow discharging of said battery cell when a discharging current through said cell reaches a predetermined discharge current level and for closing said battery selector switch means to allow charging of said battery cell when a charging current through said cell reaches a predetermined charge current level.

* * * * *